United States Patent
Myhre et al.

(10) Patent No.: US 9,425,607 B2
(45) Date of Patent: Aug. 23, 2016

(54) AC-DC CONVERTER DEVICE COMPRISING AN OVERVOLTAGE PROTECTION CIRCUIT

(71) Applicant: Eltek AS, Drammen (NO)

(72) Inventors: Erik Myhre, Asker (NO); Thomas Olsen, Asker (NO); Jan Tore Brastad, Drammen (NO)

(73) Assignee: Eltek AS, Drammen (NO)

( * ) Notice: Subject to any disclaimer, the term of this patent is extended or adjusted under 35 U.S.C. 154(b) by 12 days.

(21) Appl. No.: 14/391,766

(22) PCT Filed: Apr. 4, 2013

(86) PCT No.: PCT/EP2013/057094
§ 371 (c)(1),
(2) Date: Oct. 10, 2014

(87) PCT Pub. No.: WO2013/152983
PCT Pub. Date: Oct. 17, 2013

(65) Prior Publication Data
US 2015/0070950 A1 Mar. 12, 2015

Related U.S. Application Data

(60) Provisional application No. 61/623,299, filed on Apr. 12, 2012.

(30) Foreign Application Priority Data

Apr. 12, 2012 (GB) .................................. 1206475.4

(51) Int. Cl.
*H02H 7/125* (2006.01)
*H02H 3/20* (2006.01)
(Continued)

(52) U.S. Cl.
CPC ............... *H02H 3/20* (2013.01); *H02H 7/125* (2013.01); *H02M 1/32* (2013.01); *H02M 3/33523* (2013.01); *H02M 7/125* (2013.01); *H02M 7/217* (2013.01)

(58) Field of Classification Search
CPC .... H02H 7/125; H02H 7/127; H02H 7/1209; H02H 7/106; H02H 7/1206; H02H 7/1257; H02H 3/20; H02M 7/217; H02M 7/219; H02M 7/062
USPC ...... 363/52, 53, 76–81, 84, 89–90, 125–127
See application file for complete search history.

(56) References Cited

U.S. PATENT DOCUMENTS

2004/0021992 A1  2/2004  Takamatsu
2004/0170031 A1  9/2004  Tomiyama
(Continued)

FOREIGN PATENT DOCUMENTS

CN    1255771 A      6/2000
CN    101834528 A    9/2010
(Continued)

OTHER PUBLICATIONS

International Search Report issued in PCT/EP2013/057094 mailed on Aug. 1, 2013 (3 pages).
(Continued)

*Primary Examiner* — Gary L Laxton
*Assistant Examiner* — Kevin H Sprenger
(74) *Attorney, Agent, or Firm* — Osha Liang LLP

(57) ABSTRACT

An AC-DC converter device includes a first overvoltage protection circuit connected between a first DC output terminal and a first control terminal of a gate pulse controller. The first overvoltage protection circuit is configured to turn off a first switch if the output voltage between the DC output terminals is above a threshold voltage. A galvanic insulation barrier is connected either between the first overvoltage protection circuit and the first control terminal or between the first control terminal and the first switch.

9 Claims, 8 Drawing Sheets

(51) Int. Cl.
*H02M 1/32* (2007.01)
*H02M 3/335* (2006.01)
*H02M 7/12* (2006.01)
*H02M 7/217* (2006.01)

(56) References Cited

U.S. PATENT DOCUMENTS

| | | | |
|---|---|---|---|
| 2005/0105311 A1* | 5/2005 | Soldano | H02M 1/4225 363/89 |
| 2005/0168894 A1* | 8/2005 | Gossner | H01L 27/0292 361/56 |
| 2007/0139837 A1 | 6/2007 | Usui et al. | |
| 2011/0235224 A1* | 9/2011 | Kashima | H02J 7/0016 361/62 |
| 2013/0308360 A1* | 11/2013 | Koiwai | H02M 1/4225 363/89 |
| 2014/0055898 A1* | 2/2014 | Kostakis | H02H 3/20 361/91.5 |

FOREIGN PATENT DOCUMENTS

| | | |
|---|---|---|
| KR | 2001-0063231 A1 | 7/2001 |
| WO | 2009/028954 A1 | 3/2009 |
| WO | 2009/058024 A1 | 5/2009 |

OTHER PUBLICATIONS

Written Opinion of the International Searching Authority issued in PCT/EP2013/057094 mailed on Aug. 1, 2013 (4 pages).
Great Britain Search Report issued in 1206475.4 mailed on Aug. 22, 2012 (6 pages).
IBM Corp.; "Latching Overvoltage Protection Using Amplitude Modulated Synch"; IBM Technical Disclosure Bulletin; vol. 31, No. 4, Sep. 1988, pp. 95-96 (2 pages).
Office Action on counterpart Chinese Patent Application No. 201380019611.4 Issued on May 26, 2016 (16 pages).

* cited by examiner

AC-DC CONVERTER DEVICE COMPRISING AN OVERVOLTAGE PROTECTION CIRCUIT

CROSS-REFERENCE TO RELATED APPLICATIONS

This application is a National Stage application of International Patent Application No. PCT/EP2013/057094, filed on Apr. 4, 2013, which claims priority pursuant to Article 8 of the Patent Cooperation Treaty, 35 U.S.C. §119(a), and 119(e) to United Kingdom Patent Application No. 1206475.4 and U.S. Provisional Patent Application No. 61/623,299, respectively, both filed on Apr. 12, 2012. Each of the above-cited priority applications are hereby incorporated by reference in their entireties.

BACKGROUND

Several types of converters are known for use in power supply systems, where there is a need to convert an AC power to a controlled DC power. The AC power will usually be supplied from an AC power source, such as the mains. The DC power is supplied to equipment such as telecommunication equipment, broad band data communication equipment (GSM/UMTS base stations etc), military equipment, medical equipment etc.

There are several requirements for such power supply systems. First of all, the efficiency should be high, i.e. the losses should be low. The power supply system described in WO 2009/028954 and WO 2009/058024 has an efficiency of ca 96% and is marketed and sold by Eltek Valere under the name FlatPack 2 HE. The power supply system provided as a unit for insertion into a rack. The unit has an height of 1 U (the standard height of one shelf in a rack, corresponding to 44.5 mm), a length of 328 mm and a width of 109 mm so that four such units may be provided next to each other in a 19" rack. The unit may deliver a power of 2 kW or 3 kW at −48V DC.

An object of the next generation power supply is to provide a smaller unit having substantially the same power as the above power supply system and with a relatively high efficiency. More specifically, the new unit should be 1 U high. The length should be 220 mm so that the unit and the rack may be provided in a 30 cm power cabinet. In addition, the width should 72 mm in order to provide that six such units may be provided next to each other in a 19" rack. The unit should be able to supply a power of 2-3000 W at −48V DC. Hence, the available volume for the components is reduced by approximately 55%.

Another object of the next generation power supply system is to reduce costs. One contribution to cost reduction is the reduced size. Another contribution to cost reduction is to use cheaper electronic components such as processor units etc.

However, such electronic components are simpler, and consequently, effort must be put into using the electronic components smarter. One way of achieving this is to reduce the number of calculations needed for controlling the power supply system.

The power supply system comprises a fan for blowing air through the unit. The fan is normally located on the front side of the unit and blows air out through the rear side of the unit. The increased power density (power per volume unit) of the unit makes it difficult to achieve a satisfying air flow through the unit.

U.S. Patent Application Publication No. 2004/170031 relates to a power supply system which is implemented without adding a filter circuit, by configuring an overvoltage protection circuit without a thyristor. A sub-loop control circuit is added to an AC/DC converter. The sub-loop control circuit is configured such that a photoreceptor side transistor of a photocoupler 26 has the collector terminal connected to the gate terminal of a MOS-FET 2 via a resistor 38, the emitter terminal is connected to the base terminal of a transistor 3, and the phototransmitter side of the photocoupler 26 is connected to an operational amplifier 39, resistors 40-43, and a Zener diode 44. In addition, in a DC-DC converter, a Zener diode 45 is connected across the input of the converter and the non-inverting input terminal of a comparator 33, with the anode of the Zener diode being connected to the non-inverting input terminal.

U.S. Patent Application Publication No. 2004/021992 relates to an overvoltage output protector being electrically connected to a constant-voltage switching power supply, which includes a switching transistor converting a DC voltage obtained by smoothing an AC voltage supplied from an AC power source into a cyclic pulse signal. In the overvoltage output protector, an overvoltage monitor indicates whether a potential of the cyclic pulse signal is at or exceeds a predetermined value. A deactivator turns off the switching transistor in a case where the overvoltage monitor indicates that the potential of the cyclic pulse signal is at or exceeds the predetermined value.

In some applications, there is a requirement for the safety integrity level (SIL) for the power supply unit. The safety integrity level is defined as a relative level of risk-reduction provided by a safety function, or to specify a target level of risk reduction. The International Electrotechnical Commission's (IEC) standard IEC EN 61508 defines SIL using requirements grouped into two broad categories: hardware safety integrity and systematic safety integrity. A device or system must meet the requirements for both categories to achieve a given SIL.

One example of such an application is equipment for the oil and gas industry, where the equipment needs a 24 V DC input, and where the function of the equipment is not guaranteed at voltages above 30 V CD, alternatively that a certain SIL level is not guaranteed at such voltages. Hence, one or more embodiments of the invention provide a power supply unit which have a considerably reduced risk of supplying power above 30 V DC, so that the risk of failure in the equipment itself is reduced. More specifically, on or more embodiments of the invention provide a power supply unit where the risk of supplying power above 30 V DC is categorized as SIL 3. Of course, the equipment may have a voltage limit being different than 30 V DC.

It should be noted that the SIL categorization often requires relative complex computations of probability analysis. The more complex the power supply unit is, the more complex the computations will be. Hence, one or more embodiments of the invention simplify the power supply unit in order to simplify the computation of SIL. One or more embodiments of the invention also provide an indication of the status, and hence the SIL status, of the power supply unit.

SUMMARY

One or more embodiments of the present invention relates to an AC-DC converter device including an AC-DC converter and a DC-DC converter connected between first and second AC input terminals and first and second DC output terminals, where the DC-DC converter comprises a first galvanic insulation barrier defining a border between a primary side and a secondary side of the AC-DC converter device and where the DC-DC converter comprises a first switch on the primary side. The AC-DC converter device further includes a gate pulse controller comprising a first control terminal connected to the first switch, a second galvanic insulation barrier, and a first overvoltage protection circuit connected between the first DC output terminal and the first control terminal of the gate pulse controller.

The first overvoltage protection circuit is configured to turn off the first switch if the output voltage between the DC output terminals is above a threshold voltage. The second galvanic insulation barrier is connected either between the first overvoltage protection circuit and the first control terminal (i.e. the gate pulse controller is on the primary side) or between the first control terminal and the first switch (i.e. the gate pulse controller is on the secondary side).

The first overvoltage protection circuit includes a first comparator for comparing the DC output voltage with the threshold voltage, a first OVP switch including a first terminal connected to ground, a second terminal connected to the first control terminal of the gate pulse controller, and a gate terminal connected to an output terminal of the first comparator. The first OVP switch is turned on when the output voltage is above the threshold voltage.

According to the above, a simple overvoltage protection circuit is achieved, where it is relatively easy to compute the SIL category.

In one aspect the AC-DC converter device further includes a second overvoltage protection circuit connected between the first DC output terminal and the first control terminal of the gate pulse controller. The second overvoltage protection circuit is configured to turn off the first switch if the output voltage between the DC output terminals is above a threshold voltage. The second galvanic insulation barrier is connected either between the second overvoltage protection circuit and the first control terminal or between the first control terminal and the first switch.

By adding another overvoltage protection circuit, the redundancy is increased and the SIL category is increased.

In one aspect the AC-DC converter device further includes a third overvoltage protection circuit connected between the first DC output terminal and the first control terminal of the gate pulse controller. The third overvoltage protection circuit is configured to turn off the first switch if the output voltage between the DC output terminals is above a threshold voltage. The third galvanic insulation barrier is connected either between the third overvoltage protection circuit and the first control terminal or between the first control terminal and the first switch.

By adding yet another overvoltage protection circuit, the redundancy is increased and the SIL category is increased.

In one aspect the first overvoltage protection circuit further includes a first resistor device connected between the first terminal of the first OVP switch and ground, a second comparator for comparing a voltage of the first terminal of the first OVP switch and a second reference voltage, and a first LED diode connected to the output of the second comparator. The first LED diode is configured to conduct when the first OVP switch is turned on.

In one aspect the DC-DC converter includes a second switch on the primary side and where the gate pulse controller comprises a second control terminal connected to the second switch, where the first overvoltage protection circuit includes a second OVP-switch comprising a first terminal connected to ground, a second terminal connected to the second control terminal of the gate pulse controller and a gate terminal connected to an output terminal of the first comparator, where the second OVP switch is turned on when the output voltage is above the threshold voltage.

In one aspect the first overvoltage protection circuit further includes a second resistor device connected between the first terminal of the second OVP switch and ground, a third comparator for comparing a voltage of the first terminal of the second OVP switch and a second reference voltage, a second LED diode connected to the output of the third comparator where the second LED diode is configured to conduct when the second OVP switch is turned on.

If several overvoltage protection circuits are used, they should be equal to each other in order to simplify the SIL level computation. Hence, the above aspects also relates to the second and third overvoltage protection circuits as well.

BRIEF DESCRIPTION OF THE DRAWINGS

Embodiments of the invention will now be described in detail with reference to the enclosed drawings, where.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

Figure 1:
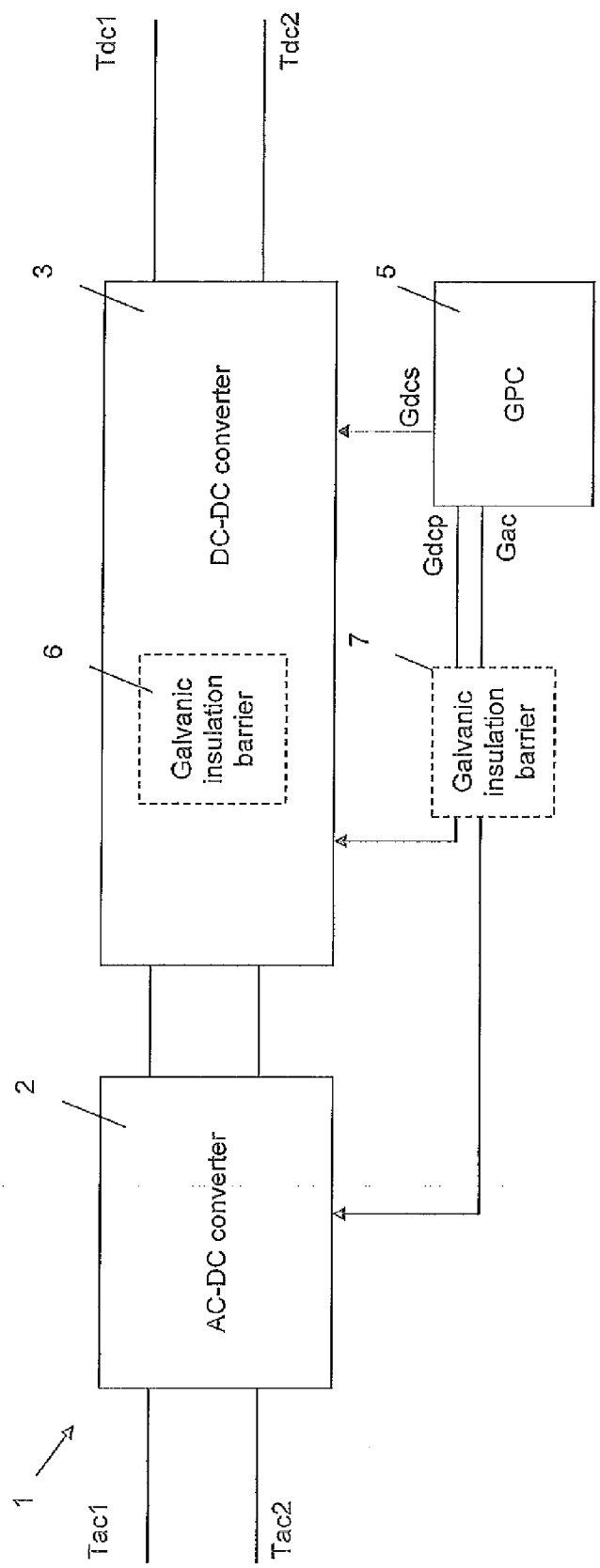
FIG. 1 illustrates a prior art general AC-DC converter device.

It is now referred to FIG. 1, illustrating a prior art AC-DC converter device 1. One embodiment of such a prior art AC-DC converter device 1 is shown in FIG. 2 and is considered known from WO2009/028954.

The AC-DC converter device 1 comprises an AC-DC converter denoted with a dashed box 2 and a DC-DC converter denoted with a dashed box 3 connected between first and second AC input terminals Tac1, Tac2 and first and second DC output terminals Tdc1, Tdc2. As shown in FIG. 2, the DC-DC converter 3 comprises a transformer device Tdc forming the galvanic insulation barrier 6 of FIG. 1. The galvanic insulation barrier 6 is defining a border between a primary side P and a secondary side S of the AC-DC converter device 1. The galvanic insulation barrier 6 is hereinafter referred to as a first galvanic insulation barrier 6.

Figure 2:
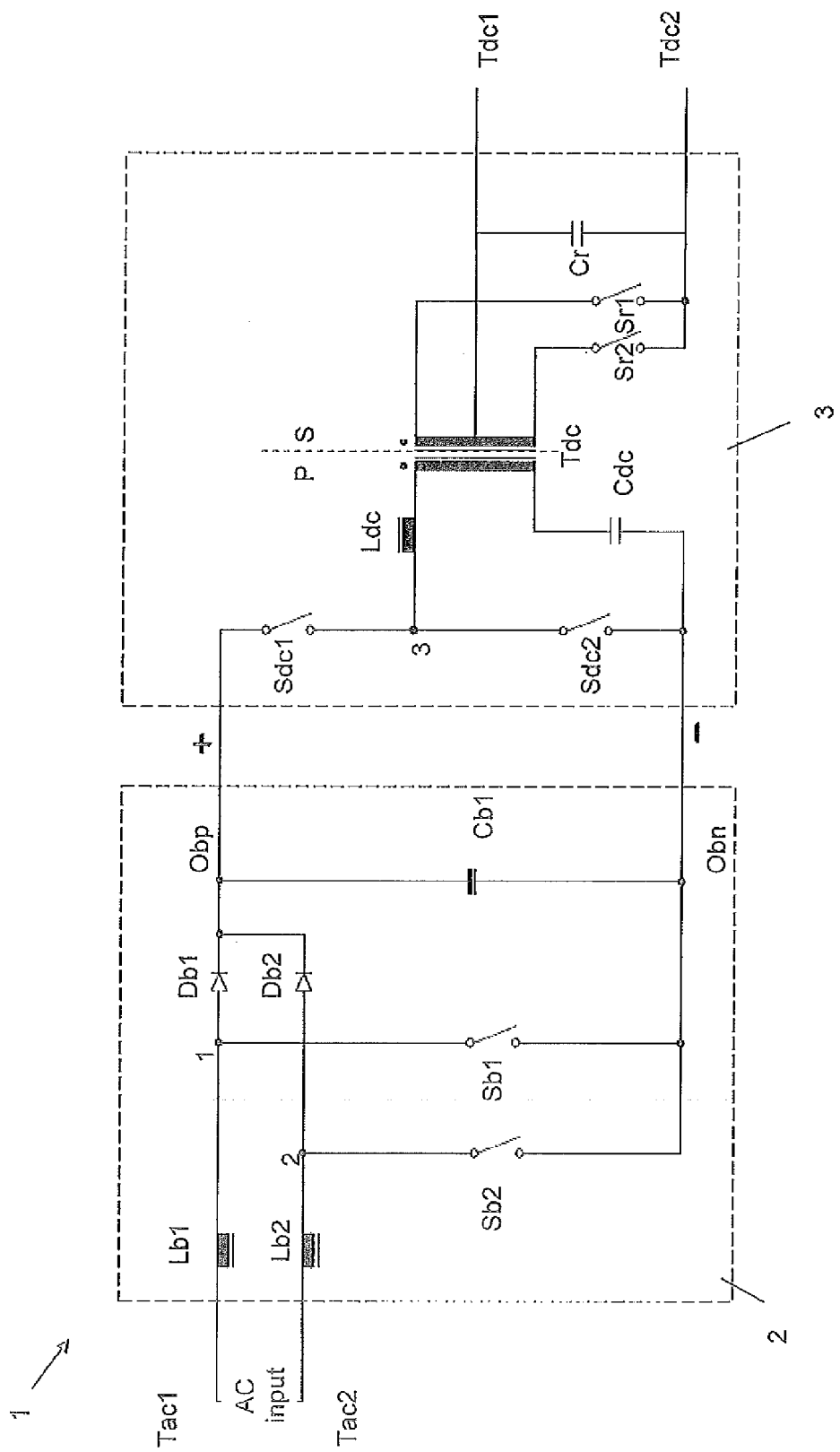
FIG. 2 illustrates one example of a prior art AC-DC converter device.

As shown in FIG. 2, the DC-DC converter 3 comprises two switches Sdc1, Sdc2 on the primary side P. However, in a first embodiment described below, it is assumed that the DC-DC converter only comprises one switch, hereinafter denoted as a first switch Sdc1.

When the first switch Sdc1 is turned on, energy is allowed to be transferred from the AC-DC converter 2 to the transformer device Tdc. When the first switch Sdc1 is turned off, energy is prevented from flowing from the AC-DC converter 2 and further into the DC-DC converter.

As shown in FIG. 2, the DC-DC converter may also comprise switches Sr1, Sr2 on the secondary side S.

The AC-DC converter device 1 further comprises a gate pulse controller (GPC) 5 for controlling the first switch Sdc1 on the primary side P. The gate pulse controller 5 is typically a digital signal processor receiving measuring signals of input voltage and/or output voltage Vdcout, input current and/or output current etc. In the present embodiment, the gate pulse controller 5 is comprising a first control terminal Gdcp1 connected to the first switch Sdc1, i.e. connected to the gate terminal of the first switch Sdc1. The gate pulse controller 5 may also be used to control other switches, such as the switches of the AC-DC converter 2 and the switches Sr1, Sr2 on the secondary side S of the DC-DC converter 3. However, it is also possible to provide separate control circuits for controlling those other switches.

In FIG. 1 it is shown that a second galvanic insulation barrier 7 is provided between the first control terminal Gdcp1 and the first switch Sdc1. This is necessary in FIG. 1 since the gate pulse controller 5 is provided on the secondary side S of the AC-DC converter device 1.

Figure 3:
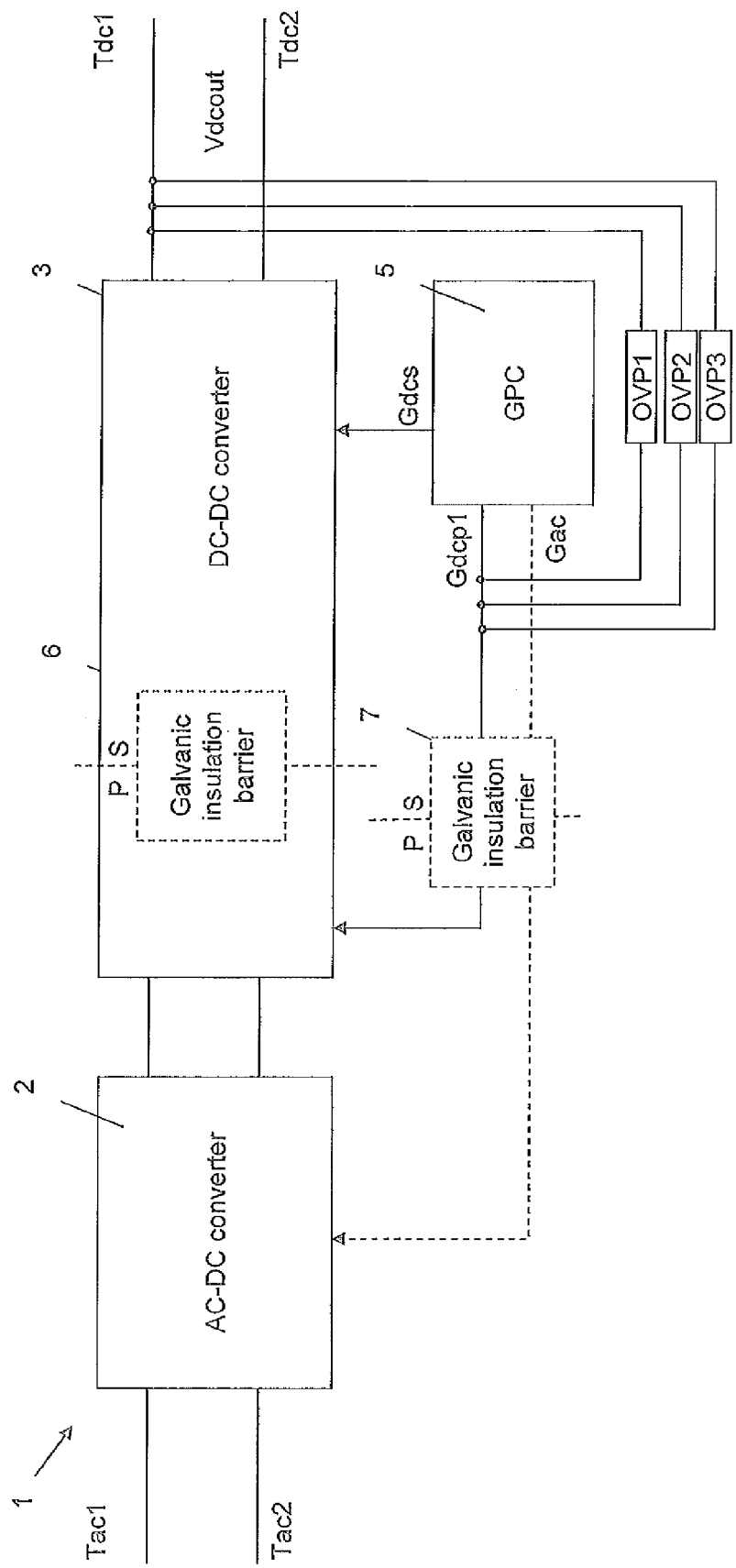
FIG. 3 illustrates a first embodiment of the invention.

It is now referred to FIG. 3, illustrating a first embodiment of the invention.

Here the AC-DC converter device 1 further comprises a first overvoltage protection circuit OVP1 connected between the first DC output terminal Tdc1 and the control terminal Gdcp1 of the gate pulse controller 5. The first overvoltage protection circuit OVP1 is configured to turn off the first switch Sdc1 if the output voltage Vdcout between the DC output terminals Tdc1, Tdc2 is above a threshold voltage Vref1.

In one example the AC-DC converter device 1 is configured to supply a 24V DC output to its output terminals Tdc1, Tdc2 (i.e. the nominal value of the output voltage Vdcout=24 V). The function of the electrical equipment connected to the output terminals is not guaranteed at voltages above 30 V DC, alternatively a certain SIL level is not guaranteed at such voltages. A threshold voltage Vref1 is therefore set to 30 Vdc in the overvoltage protection circuit OVP1. Hence, if the AC-DC converter device 1 fails (due to overvoltage on the AC input terminals, due to errors in the control circuit of the AC-DC converter device 1 etc), and supplies a voltage Vdcout which is above Vref1=30 V DC, the overvoltage protection circuit OVP 1 is forcing the first switch Sdc1 off, and hence, the electrical equipment is protected, since the output voltage Vdcout will decrease immediately since no energy is allowed to pass the first switch Sdc1. It should be noted that if there are more than one switch on the primary side P of the DC-DC converter 3, all these switches are turned off by the overvoltage protection circuit OVP 1.

In the embodiment in FIG. 3, the second galvanic insulation barrier 7 is connected between the first control terminal Gdcp1 and the first switch Sdc1, similar to the embodiment of FIG. 1.

To achieve a higher SIL level, the number of overvoltage protection circuits may be increased. In FIG. 3 it is shown a second overvoltage protection circuit OVP2 and a third overvoltage protection circuit OVP3.

The second overvoltage protection circuit OVP2 is connected between the first DC output terminal Tdc1 and the first control terminal Gdcp1 of the gate pulse controller 5. The second overvoltage protection circuit OVP2 is, as the first overvoltage protection circuit OVP1, configured to turn off the first switch Sdc1 if the output voltage Vdcout between the DC output terminals Tdc1, Tdc2 is above a threshold voltage Vref1. In the embodiment of FIG. 3, the second galvanic insulation barrier 7 is connected between the first control terminal Gdcp1 and the first switch Sdc1.

The third overvoltage protection circuit OVP3 is connected between the first DC output terminal Tdc1 and the first control terminal Gdcp1 of the gate pulse controller 5. The third overvoltage protection circuit OVP3 is, as the first and second overvoltage protection circuits OVP 1 and OVP2, configured to turn off the first switch Sdc1 if the output voltage Vdcout between the DC output terminals Tdc1, Tdc2 is above a threshold voltage Vref1. In the embodiment of FIG. 3, the third galvanic insulation barrier 7 is connected between the first control terminal Gdcp1 and the first switch Sdc1.

Hence, in FIG. 3, it is shown that there are three overvoltage protection circuits OVP1, OVP2, OVP3 in parallel. It is sufficient that one of these is working in order to turn the first switch Sdc1 off, thereby overriding the other overvoltage protection circuits and the gate pulse controller 5 in order to force the voltage below the threshold voltage Vref1.

The overvoltage protection circuits OVP1, OVP2 and OVP3 should be fast-responding circuits in order to reduce the time period in which the output voltage Vdcout is above the threshold voltage Vref1. Moreover, the overvoltage protection circuits should be de-activated when the output voltage Vdcout is below the threshold voltage Vref1 again, and hence be controlled by the gate pulse controller 5 again.

Figure 4A:
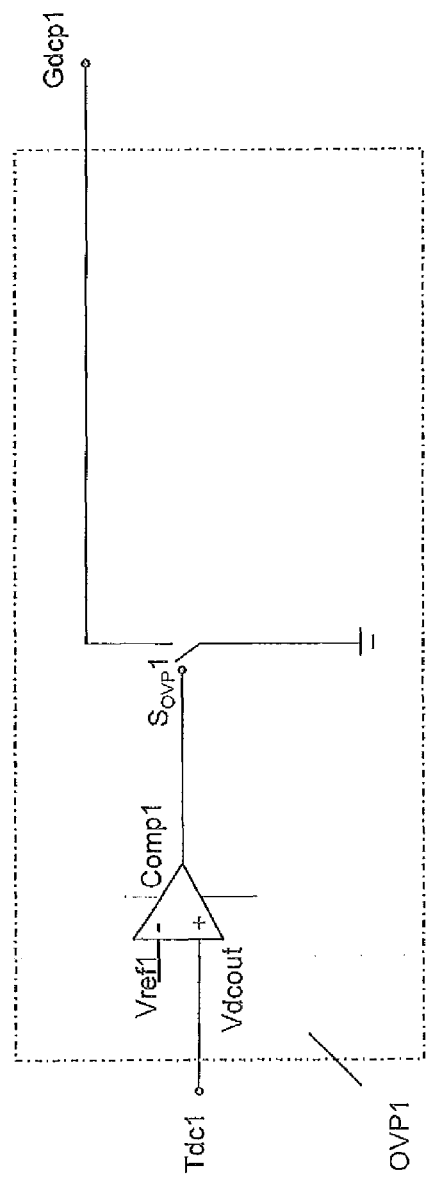
FIG. 4a illustrates a first embodiment of one of the overvoltage protection circuits of FIG. 3.

It is now referred to FIG. 4a, illustrating a first embodiment of the first overvoltage protection circuit OVP1 used in FIG. 3. In the present embodiment, the first overvoltage protection circuit OVP 1 is identical to the second and third overvoltage protection circuits OVP2, OVP3.

The first overvoltage protection circuit OVP 1 comprises a first comparator for comparing the DC output voltage Vdcout with the threshold voltage. Moreover, it comprises a first OVP switch comprising a first terminal connected to ground, a second terminal connected to the first control terminal Gdcp1 of the gate pulse controller and a gate terminal connected to an output terminal of the first comparator. In normal operation, the state of the first OVP switch in FIG. 4a is off.

However, the first OVP switch is turned on when the output voltage Vdcout is above the threshold voltage.

Figure 4B:
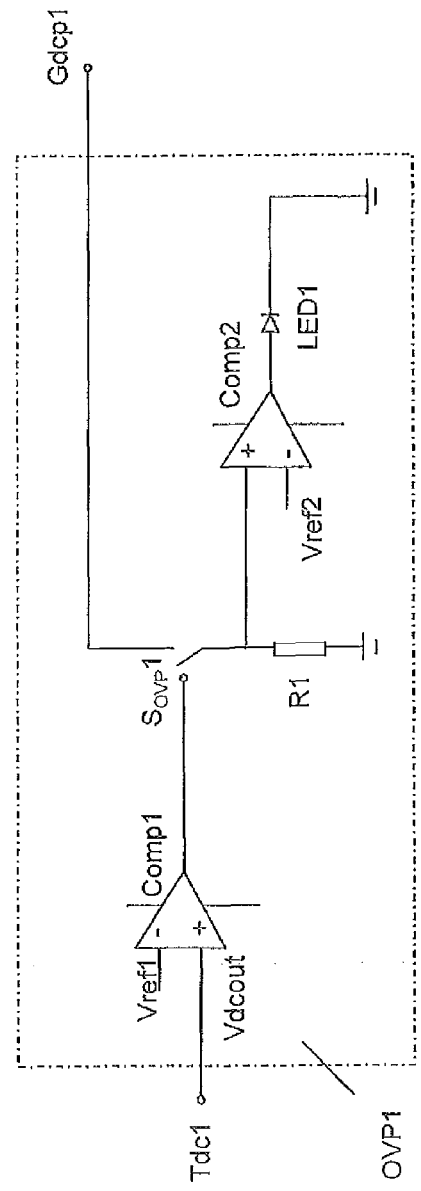
FIG. 4b illustrates a second embodiment of one of the overvoltage protection circuits of FIG. 3.

A second embodiment of the first overvoltage protection circuit OVP1 used in FIG. 3 is shown in FIG. 4b. Here, the first overvoltage protection circuit OVP1 further comprises a first resistor device R1 connected between the first terminal of the first OVP switch $S_{OVP}1$ and ground. Moreover, it comprises a second comparator Comp2 for comparing a voltage of the first terminal of the first OVP switch $S_{OVP}1$ and a second reference voltage Vref2. It also comprises a first LED diode LED1 connected to the output of the second comparator Comp2, where the first LED diode LED1 is configured to conduct when the first OVP switch $S_{OVP}1$ is turned on.

The first LED diode LED1 is visible outside the AC-DC converter device 1 and is used for diagnostic purposes, i.e. to check if the overvoltage protection circuit OVP1 is working properly. To perform a diagnosis, the AC-DC converter device 1 is connected to a 100-240 V AC input voltage and a 28 V DC output voltage. The LED diode is not supposed to emit light. Then the output voltage is adjusted to 30 V DC. Now the LED diode is supposed to emit light. If this is the case, the overvoltage protection circuit is working satisfying.

Figure 4C:
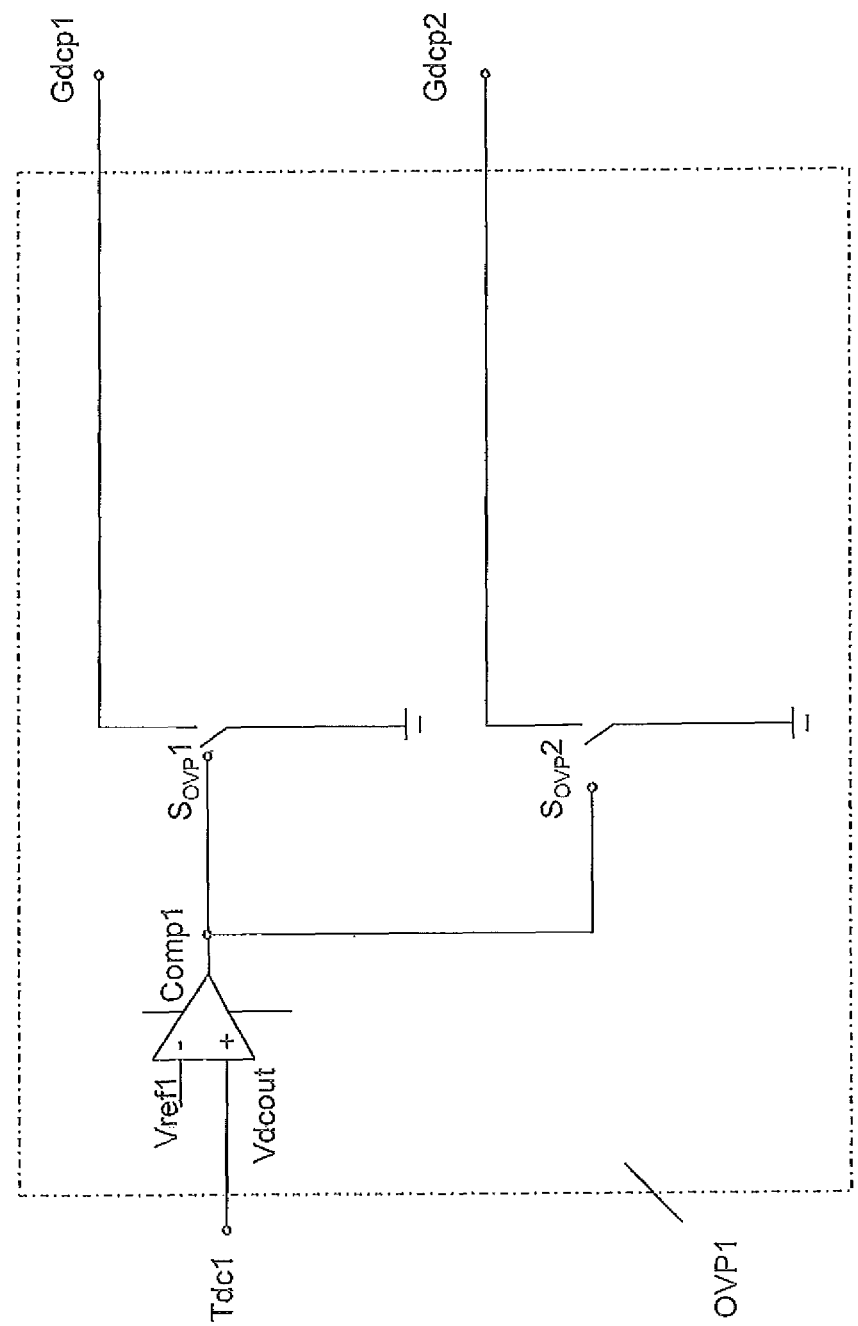
FIG. 4c illustrates a third embodiment of one of the overvoltage protection circuits.

A third embodiment of the first overvoltage protection circuit OVP1 used in FIG. 3 is shown in FIG. 4c. Here, the DC-DC converter comprises a second switch Sdc2 on the primary side. Hence, the gate pulse controller comprises a second control terminal Gdcp2 (not shown in FIG. 3, but shown in FIG. 4c) connected to the second switch Sdc2, that is to the gate terminal of the second switch Sdc2. The first overvoltage protection circuit is similar to the first overvoltage protection circuit OVP1 shown in FIG. 4a. However, in addition, it comprises a second OVP switch $S_{OVP}2$ comprising a first terminal connected to ground, a second terminal connected to the second control terminal Gdcp2 of the gate pulse controller and a gate terminal connected to an output terminal of the first comparator Comp1. In normal operation, the state of the second OVP switch $S_{OVP}2$ in FIG. 4c is off. However, the second OVP switch $S_{OVP}2$ is turned on when the output voltage (Vdcout) is above the first threshold voltage Vref1.

Figure 4D:
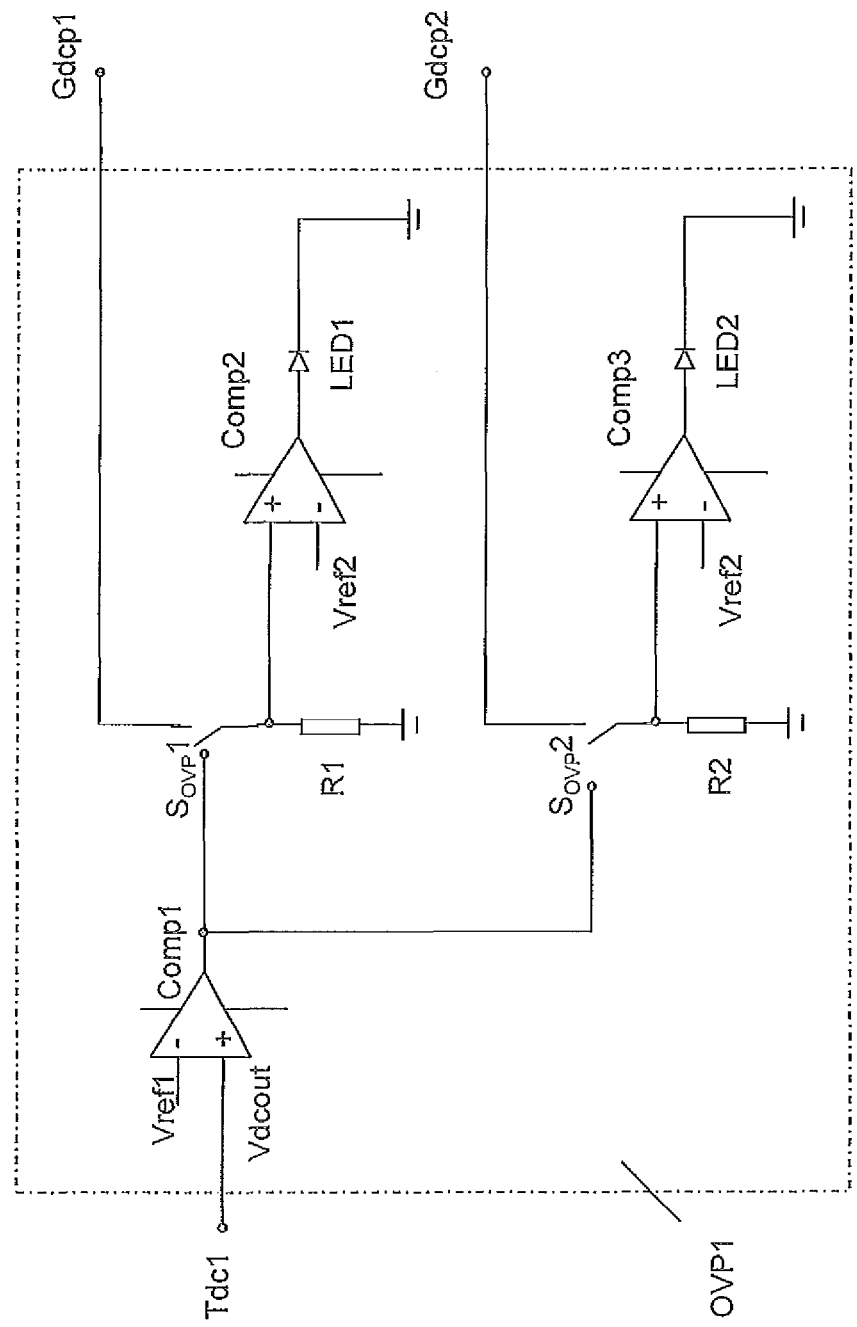
FIG. 4d illustrates a fourth embodiment of one of the overvoltage protection circuits.

A fourth embodiment of the first overvoltage protection circuit OVP 1 used in FIG. 3 is shown in FIG. 4d. Also here the DC-DC converter comprises a second switch Sdc2 on the primary side. The first overvoltage protection circuit OVP 1 is here a combination of the one shown in FIG. 4b and the one shown in FIG. 4c. Hence, the first overvoltage protection circuit OVP1 comprises the first switch $S_{OVP}1$, the first resistor device R1, the second comparator Comp2 and the first LED diode LED1 from FIG. 4b and it comprises the second switch $S_{OVP}2$ from FIG. 4c.

In addition, the overvoltage protection circuit OVP 1 comprises a second resistor device R2 connected between the first terminal of the second OVP switch $S_{OVP}2$ and ground. Moreover, it comprises a third comparator Comp3 for comparing a voltage of the first terminal of the second OVP switch $S_{OVP}2$ and the second reference voltage Vref2. It also comprises a second LED diode LED2 connected to the output of the third comparator Comp3 where the second LED diode LED2 is configured to conduct when the second OVP switch $S_{OVP}2$ is turned on.

Both the first and second LED diodes LED1, LED2 are visible outside the AC-DC converter device 1 and are used for diagnostic purposes by using the same method as above. Here, the second LED diode should behave like the first LED diode if the overvoltage protection circuit OVP1 is working properly.

In an embodiment with three overvoltage protection circuits and two primary switches Sdc1, Sdc2, there would be six LED diodes for diagnostic purposes.

Figure 5:
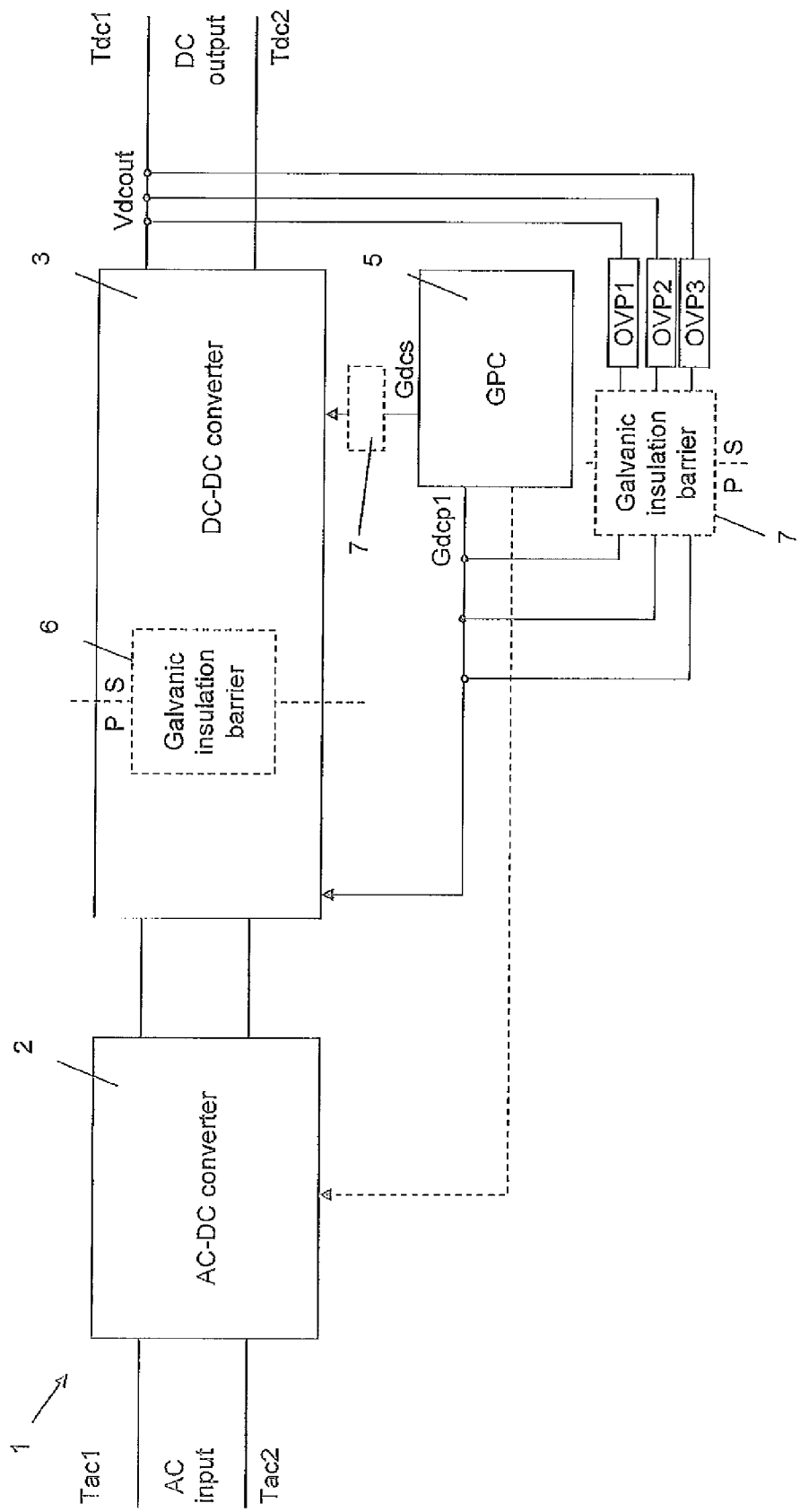
FIG. 5 illustrates a second embodiment of the invention.

A second embodiment of the AC-DC converter device 1 is shown in FIG. 5. The difference between the first embodiment shown in FIG. 3 and the second embodiment shown in FIG. 5 is that in FIG. 3, the gate pulse controller is provided on the secondary side S of the converter device 1 and in FIG. 5, the gate pulse controller is provided on the primary side P of the converter device 1. Hence, in FIG. 5, the second galvanic insulation barrier 7 is connected between the first overvoltage protection circuit OVP 1 and the first control terminal Gdcp1.

Also in FIG. 5 it is shown that the converter device 1 may comprise additional second and third overvoltage protection circuits. Also here, the galvanic insulation barrier 7 is connected between the respective second or third overvoltage protection circuit OVP2, OVP3 and the control terminal Gdcp.

It should be noted that in the drawings, the galvanic insulation barrier 7 is represented by a dashed box common for all three overvoltage protection circuits OVP1, OVP2, OVP3. Physically, there will be one separate galvanic insulation barrier for each of the overvoltage protection circuit. The galvanic insulation barrier 7 may for example be implemented as one optocoupler for each overvoltage protection circuit.

Figure 6A:
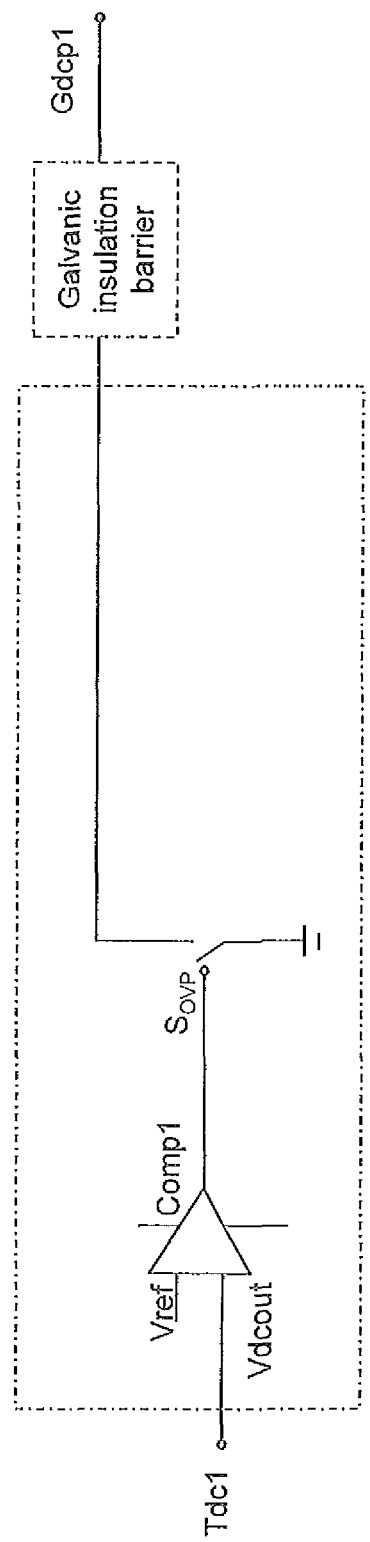
FIG. 6a illustrates the connection of one of the overvoltage protection circuits of FIG. 5.

It is now referred to FIG. 6. FIG. 6 corresponds to FIG. 4a, with the difference that the galvanic insulation barrier is provided between the second terminal of the first OVP switch $S_{OVP}1$ and the first control terminal Gdcp1, as it would be in the case of FIG. 5. The embodiments of FIGS. 4b, 4c and 4d may also be used for the embodiment of FIG. 5 with a galvanic insulation barrier as shown in FIG. 6.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. An AC-DC converter device comprising:
   an AC-DC converter and a DC-DC converter connected between first and second AC input terminals and first and second DC output terminals, where the DC-DC converter comprises a first galvanic insulation barrier defining a border between a primary side and a secondary side of the AC-DC converter device and where the DC-DC converter comprises a first switch on the primary side;
   a gate pulse controller comprising a first control terminal connected to the first switch;
   a second galvanic insulation barrier;
   a first overvoltage protection circuit connected between the first DC output terminal and the first control terminal of the gate pulse controller;
   wherein the first overvoltage protection circuit is configured to turn off the first switch if an output voltage between the DC output terminals is above a threshold voltage;
   wherein the second galvanic insulation barrier is connected either between the first overvoltage protection circuit and the first control terminal or between the first control terminal and the first switch; and
   wherein the first overvoltage protection circuit comprises:
   a first comparator for comparing the DC output voltage with the threshold voltage;
   a first OVP switch comprising a first terminal connected to ground, a second terminal connected to the first control terminal of the gate pulse controller, and a gate terminal connected to an output terminal of the first comparator, wherein the first OVP switch is turned on when the output voltage is above the threshold voltage.

2. The AC-DC converter device according to claim 1, wherein the AC-DC converter device further comprises:
   a second overvoltage protection circuit connected between the first DC output terminal and the first control terminal of the gate pulse controller;
   wherein the second overvoltage protection circuit is configured to turn off the first switch if the output voltage between the DC output terminals is above a threshold voltage; and
   wherein the second galvanic insulation barrier is connected either between the second overvoltage protection circuit and the first control terminal or between the first control terminal and the first switch.

3. The AC-DC converter device according to claim 1, wherein the AC-DC converter device further comprises:
a third overvoltage protection circuit connected between the first DC output terminal and the first control terminal of the gate pulse controller;
wherein the third overvoltage protection circuit is configured to turn off the first switch if the output voltage between the DC output terminals is above a threshold voltage; and
wherein the third galvanic insulation barrier is connected either between the third overvoltage protection circuit and the first control terminal or between the first control terminal and the first switch.

4. The AC-DC converter device according to claim 1, wherein the first overvoltage protection (OVP) circuit further comprises:
a first resistor device connected between the first terminal of the first OVP switch and ground;
a second comparator for comparing a voltage of the first terminal of the first OVP switch and a second reference voltage;
a first LED diode connected to the output of the second comparator where the first LED diode is configured to conduct when the first OVP switch is turned on.

5. The AC-DC converter device according to claim 4, wherein the DC-DC converter comprises a second switch on the primary side and where the gate pulse controller comprises a second control terminal connected to the second switch, wherein the first overvoltage protection circuit comprises a second OVP-switch comprising a first terminal connected to ground, a second terminal connected to the second control terminal of the gate pulse controller and a gate terminal connected to an output terminal of the first comparator, wherein the second OVP switch is turned on when the output voltage is above the threshold voltage.

6. The AC-DC converter device according to claim 5, wherein the first overvoltage protection circuit further comprises:
a second resistor device connected between the first terminal of the second OVP switch and ground;
a third comparator for comparing a voltage of the first terminal of the second OVP switch and a second reference voltage;
a second LED diode connected to the output of the third comparator where the second LED diode is configured to conduct when the second OVP switch is turned on.

7. The AC-DC converter device according to claim 2, wherein the AC-DC converter device further comprises:
a third overvoltage protection circuit connected between the first DC output terminal and the first control terminal of the gate pulse controller;
wherein the third overvoltage protection circuit is configured to turn off the first switch if the output voltage between the DC output terminals is above a threshold voltage; and
wherein the third galvanic insulation barrier is connected either between the third overvoltage protection circuit and the first control terminal or between the first control terminal and the first switch.

8. The AC-DC converter device according to claim 2, wherein the first overvoltage protection circuit comprises:
a first comparator for comparing the DC output voltage with the threshold voltage;
a first OVP switch comprising a first terminal connected to ground, a second terminal connected to the first control terminal of the gate pulse controller and a gate terminal connected to an output terminal of the first comparator, where the first OVP switch is turned on when the output voltage is above the threshold voltage.

9. The AC-DC converter device according to claim 3, wherein the first overvoltage protection circuit comprises:
a first comparator for comparing the DC output voltage with the threshold voltage;
a first OVP switch comprising a first terminal connected to ground, a second terminal connected to the first control terminal of the gate pulse controller and a gate terminal connected to an output terminal of the first comparator, where the first OVP switch is turned on when the output voltage is above the threshold voltage.

* * * * *